United States Patent [19]

DesJardins et al.

[11] Patent Number: 5,327,177
[45] Date of Patent: Jul. 5, 1994

[54] METHOD OF AND APPARATUS FOR PROCESSING A SHAPED VIDEO SIGNAL TO ADD A SIMULATED SHADOW

[75] Inventors: Philip DesJardins; John J. Proctor, both of Nevada City, Calif.

[73] Assignee: The Grass Valley Group, Inc., Nevada City, Calif.

[21] Appl. No.: 887,966

[22] Filed: May 26, 1992

[51] Int. Cl.$^5$ .................... H04N 5/272; H04N 5/275
[52] U.S. Cl. .................... 348/586; 348/590; 348/591; 348/578; 345/139; 395/126
[58] Field of Search .................... 358/22, 22 CK, 22 C, 358/22 PIP, 183, 185, 160; 340/729; 395/138, 126, 118; 382/45, 54; 345/139; H04N 5/272, 5/275

[56] References Cited

U.S. PATENT DOCUMENTS

| | | | |
|---|---|---|---|
| 4,041,527 | 8/1977 | Rayner et al. | 358/22 CK |
| 4,109,278 | 8/1978 | Mendrala et al. | 358/22 CK |
| 4,689,681 | 8/1987 | Jackson | 358/183 |
| 4,851,912 | 7/1989 | Jackson et al. | 358/183 |
| 4,875,097 | 10/1989 | Jackson | 358/183 X |
| 4,887,159 | 12/1989 | Chaplin | 358/183 |
| 4,951,144 | 8/1990 | Des Jardins | 358/22 X |

FOREIGN PATENT DOCUMENTS

| | | | |
|---|---|---|---|
| 56-061874 | 5/1981 | Japan | 358/22 CK |
| 58-117787 | 7/1983 | Japan | 358/22 CK |

Primary Examiner—James J. Groody
Assistant Examiner—Safet Metjahic
Attorney, Agent, or Firm—Francis I. Gray; John Smith-Hill

[57] ABSTRACT

A shaped video having an input key control signal associated therewith is processed by carrying out a first operation on the input key control signal to provide a first processed signal, carrying out a second operation on the first processed signal to provide a second processed signal, and combining the shaped video signal and the second processed signal to provide an output video signal. One of the first and second operations comprises translation. In this manner, a simulated shadow is added to the shaped video signal.

10 Claims, 4 Drawing Sheets

METHOD OF AND APPARATUS FOR PROCESSING A SHAPED VIDEO SIGNAL TO ADD A SIMULATED SHADOW

BACKGROUND OF THE INVENTION

This invention relates to a method of and apparatus for processing a shaped video signal that represents an object to add a simulated shadow.

A common video effect performed using a video production switcher involves displaying alphanumeric characters against a selected background scene. For example, the characters might represent the title of a news program and the background scene might be a still image of an event of current interest.

Generally, the production switcher receives a full screen digital foreground video signal representing the title characters in a field of a selected color, typically a saturated blue, and a digital key control signal that has a value of zero for all points of the video field that are outside the boundaries of the title characters, a value of one for points that are inside the boundary of a character, and a value between zero and one in transition regions at the edges of characters. The key control signal is similar to a video signal containing no hue or saturation information and having a high contrast, i.e. a video signal representing a white object in a black field. The key control signal defines the region of the field that is occupied by the title characters represented by the foreground video signal. If the foreground video signal and a background video signal are linearly mixed to form an output signal, with the contribution of the foreground signal to the output signal being directly proportional to the value of the key control signal, the key control signal determines opacity of the title characters in the composite image represented by the output signal. The foreground video signal is multiplied by the key control signal to provide a so-called shaped foreground video signal. Since a value of zero in current digital video standards represents black (after a black level offset has been subtracted), the shaped video signal represents the characters in a black field. The production switcher also receives a full field background video signal representing the selected background scene, and the background video signal and the shaped foreground video signal are applied to a mixer, which multiplies the background signal by the complement of the key control signal and additively combines the result with the shaped foreground video signal, resulting in a montage signal representing the characters against the background scene.

The result of the operation described in the preceding paragraph is generally a video signal that represents a flat image having no depth information, as if the characters had been simply painted on a screen bearing the background scene. However, an image that is generally more visually pleasing can be obtained by processing the signals so that the characters appear to cast a shadow on the background scene, whereby an impression of three-dimensional depth is imparted to the viewer. The existence of the shadow implies to the viewer that the characters are spaced from the background image and that they are illuminated, and the position of the shadow relative to the characters conveys information about the position of the imagined light source.

It is known to create this shadow effect by using a digital picture manipulator with both primary and secondary key channel memories. The key control signal, which defines the geometric region occupied by, e.g., title characters, is written into both key channel memories and the shaped foreground video signal representing the characters is written into a video channel memory. The contents of the video channel memory and the primary key channel memory are read out using the same address signal, and concurrently the contents of the secondary key channel memory are read out using an address signal that is offset, horizontally and vertically, from the address signal used to read the primary key channel memory. Accordingly, the output of the secondary key channel memory defines the same geometric shape as the output of the primary key channel memory but the shape defined by the output of the secondary key channel memory is offset slightly from the shape defined by the output of the primary key channel memory. The output of the secondary key channel memory is multiplied by a shadow density factor to provide a shadow signal, and the background video signal is multiplied by the complement of (one minus) the shadow signal to provide a modified background signal. In the modified background signal, the brightness of the background scene is reduced within the area occupied by the geometric shape defined by the output of the secondary key channel memory. The modified background signal is then combined with the output of the video channel memory, and the dimmed area of the background then appears to be a shadow cast on the background by the characters.

This method of adding shadow information is subject to disadvantage, in that it requires two key channel memories as well as a video channel memory. Further, use of a digital picture manipulator simply for addition of shadows does not make good use of the capabilities of such device, which can be used for a wide range of video effects, including those that require rotation about arbitrary axes. In a digital picture manipulator having a single key channel memory, shadows can be created by alternating key memory samples for use as both the key control signal and the shadow signal, but this technique is undesirable because it results in degradation of both the foreground image information and the shadow information.

SUMMARY OF THE INVENTION

According to a first aspect of the present invention there is provided a method of processing a shaped video signal representing an object to add a simulated shadow, said shaped video signal having an input key control signal associated therewith. The method comprises carrying out a first operation on the input key control signal to provide a first processed signal, carrying out a second operation on the first processed signal to provide a second processed signal, and combining the shaped video signal and the second processed signal to provide an output video signal. One of the first and second operations comprises translation.

According to a second aspect of the present invention there is provided apparatus for processing a shaped video signal representing an object to add a simulated shadow, said shaped video signal having an input key control signal associated therewith. The method comprises means for carrying out a first operation on the input key control signal to provide a first processed signal, means for carrying out a second operation on the first processed signal to provide a second processed signal, and means for combining the shaped video signal and the second processed signal to provide an output video signal. One of the first and second operations comprises translation.

According to a third aspect of the present invention there is provided a method of processing an input key control signal associated with a shaped video signal that represents an object to generate a signal containing simulated shadow information, said method comprising combining the input key control signal with a processed key control signal to provide an output key control signal, and carrying out a selected operation on the output key control signal to provide the processed key control signal, and wherein said selected operation comprises translation.

According to a fourth aspect of the present invention there is provided apparatus for processing an input key control signal associated with a shaped video signal that represents an object to generate a signal containing simulated shadow information. The apparatus comprises means for combining the input key control signal with a processed key control signal to provide an output key control signal, and means for carrying out a selected operation on the output key control signal to provide the processed key control signal, and wherein the selected operation comprises translation.

BRIEF DESCRIPTION OF THE DRAWINGS

For a better understanding of the invention, and to show how the same may be carried into effect, reference will now be made, by way of example, to the accompanying drawings in which.

In the several figures of the drawings, like reference numerals designate like components.

DETAILED DESCRIPTION

Figure 1:
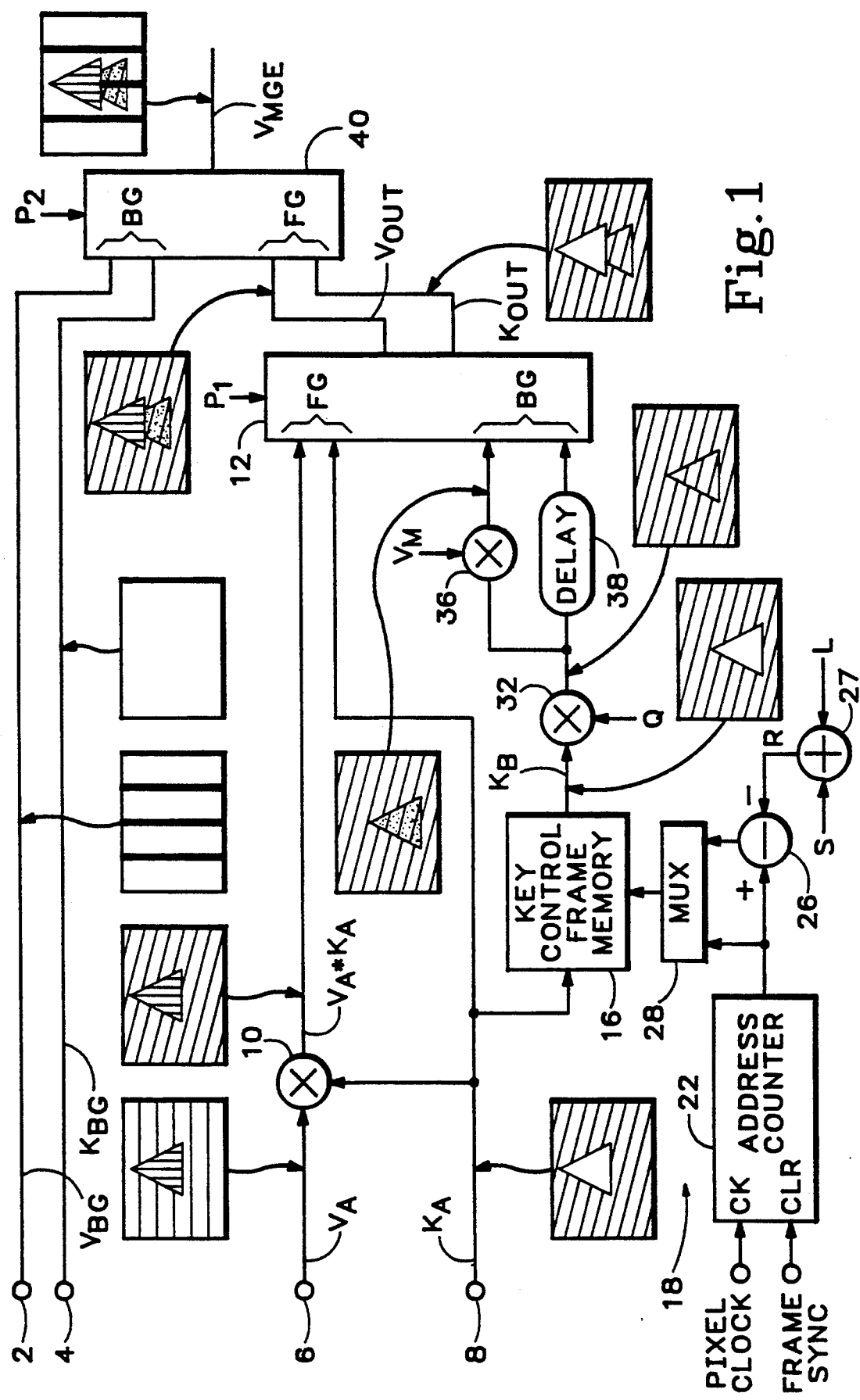
FIG. 1 is a block diagram of apparatus for processing a shaped video signal to add a simulated shadow.

The apparatus shown in FIG. 1 has background input terminals 2 and 4 at which a background video signal $V_{BG}$ and associated key control signal $K_{BG}$ respectively are received, and foreground input terminals 6 and 8 at which a foreground video signal $V_A$ and associated key control signal $K_A$ respectively are received. By way of illustration, the background video signal is represented in FIG. 1 by vertical bars and the associated key control signal is represented without shading, to designate the value one (representing full opacity) throughout the video field. The foreground video signal $V_A$ is represented schematically by a triangle with narrow vertical shading in a field of horizontal shading, and the foreground key control signal $K_A$ is represented as having the value one (represented by the area with no shading) within the boundary of the triangle and the value zero (represented by the area with narrow sloping shading) outside that boundary.

The input terminal 6 is connected to one input of a key multiplier 10, whose other input is connected to the terminal 8. Thus, the output of the key multiplier 10 is a shaped video signal $V_A*K_A$ representing the same color as the unshaped foreground video signal within the boundary of the triangle and representing the color black outside that boundary. The shaped video signal provided by the key multiplier is applied to the foreground video input of a priority combiner 12 of the kind described in U.S. Pat. No. 4,851,912, the disclosure of which is hereby incorporated by reference herein.

The input terminal 8 is connected both to the foreground key input of the priority combiner 12 and to the data input of a key control frame memory 16. The key control signal $K_A$ is written into the key control frame memory 16 and a signal $K_B$ is read from the key control frame memory. The signal $K_B$ is applied to an opacity multiplier 32, which multiplies the signal $K_B$ by an opacity constant Q and provides an output signal $Q*K_B$, represented in FIG. 1 as having the value Q (represented by wide sloping shading) within the boundary of the offset triangle and the value zero outside that boundary.

The output of the multiplier 32 is applied to one input of a second multiplier 36, which receives a full field color video signal $V_M$, typically a solid matte, at its other input and whose output is applied to the background video input of the priority combiner 12. The output of the multiplier 32 is also applied to the background key input of the priority combiner 12 through a delay 38 that compensates for latency in multiplier 36, i.e. the number of clock delays incurred in processing through multiplier 36.

The address signals used for writing to and reading from the frame memory 16 are generated by an address signal generator 18 comprising an address counter 22 that counts pixel clock pulses and is cleared by a frame sync pulse. Therefore, the output of the address counter is representative of the position (x,y) in the video raster of the pixel currently being received by the frame memory 16. The address counter 22 counts lines (vertical) and pixels (horizontal) separately, and its output is applied to the addend input of a subtraction circuit 26. An adder 27 receives a latency signal L and a shadow offset signal S and provides a resultant offset signal R, which is the sum of the latency signal L and the shadow offset signal S, to the subtrahend input of the subtraction circuit 26.

The latency signal L represents the number of pixel clock delays between the output of the memory 16 and the background inputs of the combiner 12. The latency signal L may be considered as defining a vector having a positive horizontal component $L_h$ representing a number of pixels along a line of the video raster and a positive vertical component $L_v$ representing a number of lines of the raster. The offset due to latency is usually quite small ($L_v$ is zero and $L_h$ might be about plus 10). Like the latency signal, the shadow offset signal S may be considered as defining a vector having a horizontal component $S_h$ representing a selected number of pixels along a line of the video raster and a vertical component $S_v$ representing a selected number of lines of the raster. $S_h$ and/or $S_v$ can be negative. Consequently, the resultant offset signal R defines a vector having a horizontal component $h=S_h+L_h$ and a vertical component $v=S_v+L_v$. The offset signal R is composed of the two components, v and h, which are subtracted separately by the subtraction circuit 26 from the two components of the output of the address counter 22.

The address signal generator 18 is described in co-pending patent application Ser. No. 07/867,244 filed Apr. 10, 1992, the disclosure of which is hereby incorporated by reference herein.

The output of the subtraction circuit 26 represents the position (x-h, y-v) in the video raster. Therefore, the output signal $K_B$ of the key control frame memory is the same as the input signal and is offset slightly depending upon the value of the offset signal S. For $S > = -L$, so that R is non-negative, the signal $K_B$ is delayed by at least one frame relative to the signal $K_A$ and the offset is either to a position earlier in the frame or to a position less than L pixels later in the frame. For $S < -L$ (R is negative), the delay is less than one frame and the offset is to a position later in the frame. This offset is illustrated in FIG. 1 by the triangle represented by the signal $K_B$ being lower in the raster than the triangle represented by the key control signal $K_A$. For the limited case in which S is equal to zero, so that R is equal to L, the resultant offset signal compensates for latency in processing of the key control signal and there is no offset.

The output of the multiplier 36 is a video signal $Q * K_B * V_M$ representing a black field containing a triangle that is spatially offset in accordance with the value of the shadow offset signal S and has the luminance and chrominance represented by the video signal $V_M$ but with its luminance and saturation reduced in accordance with the factor Q. The color within the triangle is represented in FIG. 1 by wide sloping shading and dots.

The priority combiner 12 provides a video output signal $V_{OUT}$ given by:

$$V_{OUT} = K_A * V_A * (1-(1-P_1) * Q * K_B) + (1-P_1 * K_A) * Q * K_B * V_M \qquad [1]$$

and a key output signal $K_{OUT}$ given by:

$$K_{OUT} = K_A * (1-(1-P_1) * Q * K_B) + (1-P_1 * K_A) * Q * K_B \qquad [2]$$

where $P_1$ is the priority signal governing operation of the priority combiner. If $P_1$ is equal to one, equations 1 and 2 become, respectively:

$$V_{OUT} = K_A * V_A 30 (1-K_A) * Q * K_B * V_M \qquad [1.1]$$

$$K_{OUT} = K_A + (1-K_A) * Q * K_B \qquad [2.1]$$

In this case, the foreground video will cover the background video where the key control signal $K_A$ is one. Where the key control signal $K_A$ is not equal to one, the video output signal $V_{OUT}$ is a linear mix of the shaped foreground video signal $V_A$ and the output of the multiplier 36, and the key output signal $K_{OUT}$ is composed of both the key control signal $K_A$ and a portion of a delayed, attenuated and offset replica of the input key control signal. The portion of the delayed, attenuated and offset replica of the input key control signal is represented in FIG. 1 against the key output of the priority combiner 12 by a trapezoidal area adjacent the base of the triangle. The shape of the trapezoidal area corresponds, of course, to the portion of the offset triangle that is not covered by the triangle defined by the key control signal $K_A$.

The video signal $V_{OUT}$ and key control signal $K_{OUT}$, possibly after further processing, are applied to the foreground inputs of a second priority combiner 40, which receives the background video and key control signals from the terminals 2 and 4 at its background inputs. The priority combiner 40 also receives a priority signal $P_2$, and provides a montage video signal $M_{GE}$ given by the equation:

$$V_{MGE} = V_{OUT} * [1 - K_{BG} * (1-P_2)] + V_{BG} * (1 - K_{OUT} * P_2) \qquad [3]$$

and a montage key signal given by:

$$K_{MGE} = 1 - (1 - K_{BG}) * (1 - K_{OUT}) \qquad [4]$$

Since $K_{BG}$ is one for all points of the field, $K_{MGE}$ is one for all points of the field and Eq. [3] becomes:

$$V_{MGE} = V_{OUT} * P + V_{BG} * (1 - K_{OUT} * P) \qquad [3.1]$$

For a priority signal $P_2$ having the value one, the montage video signal $V_{MGE}$ is given by the equation:

$$V_{MGE} = V_{OUT} + V_{BG} * (1 - K_{OUT}) \qquad [3.2]$$

and it will be appreciated that this montage video signal represents the scene shown adjacent the output of the priority combiner 40. The triangle is shown in its original (not offset) position against the background scene, and the above-mentioned trapezoidal portion of the triangle represents a shadow whose darkness (relative to the background scene) is controlled by the opacity constant Q and whose color is determined by the video signal $V_M$ and the background video signal.

The priority combiner 12 may be considered as two functionally distinct devices, namely a video combiner that executes Eq. [1] and a key combiner that executes Eq. [2]. However, since there are numerous connections between the two devices, it is convenient to illustrate the priority combiner 12 as a single block. Similarly, the priority combiner 40 may be considered as two devices that execute Eqs. [3] and [4] respectively.

Figure 2:
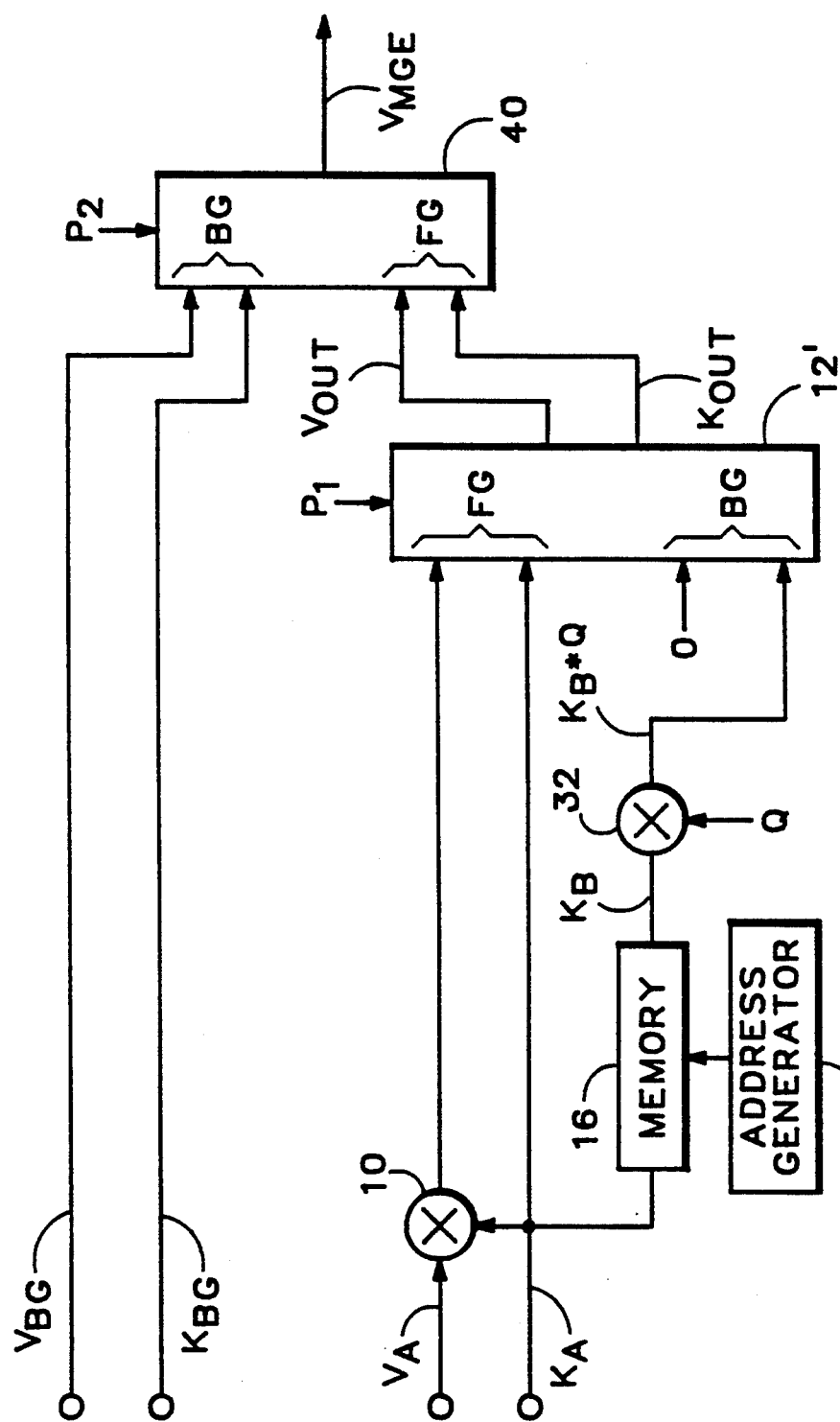
FIG. 2 is a block diagram of a modification of the apparatus shown in FIG. 1.

FIG. 2 illustrates a modification to the apparatus shown in FIG. 1. This modification is equivalent to making the luminance and chrominance components of $V_M$ equal to zero. When $P_1$ is equal to one, $K_{OUT}$ is given by Eq. [2.1] but $V_{OUT}$ is given by:

$$V_{OUT} = K_A * V_A \qquad [1.2]$$

and for $P_2$ equal to one, the montage signal $V_{MGE}$ is given by:

$$V_{MGE} = V_{OUT} + V_{BG} * (1 - K_{OUT}) \qquad [3.3]$$

The image represented by the montage signal is therefore the same as that provided by the FIG. 1 apparatus except that the shadow portion does not contain any color information that is selectable independently of the color present in the background video signal. It will be appreciated that although the apparatus shown in FIG. 2 has certain advantages over the apparatus shown in FIG. 1, in that the video multiplier 36 is not required and the priority combiner 12' need not support two video inputs, it is more limited than the apparatus shown in FIG. 1 because the shadow is black. The opacity of the shadow is governed by the factor Q.

Figure 3:
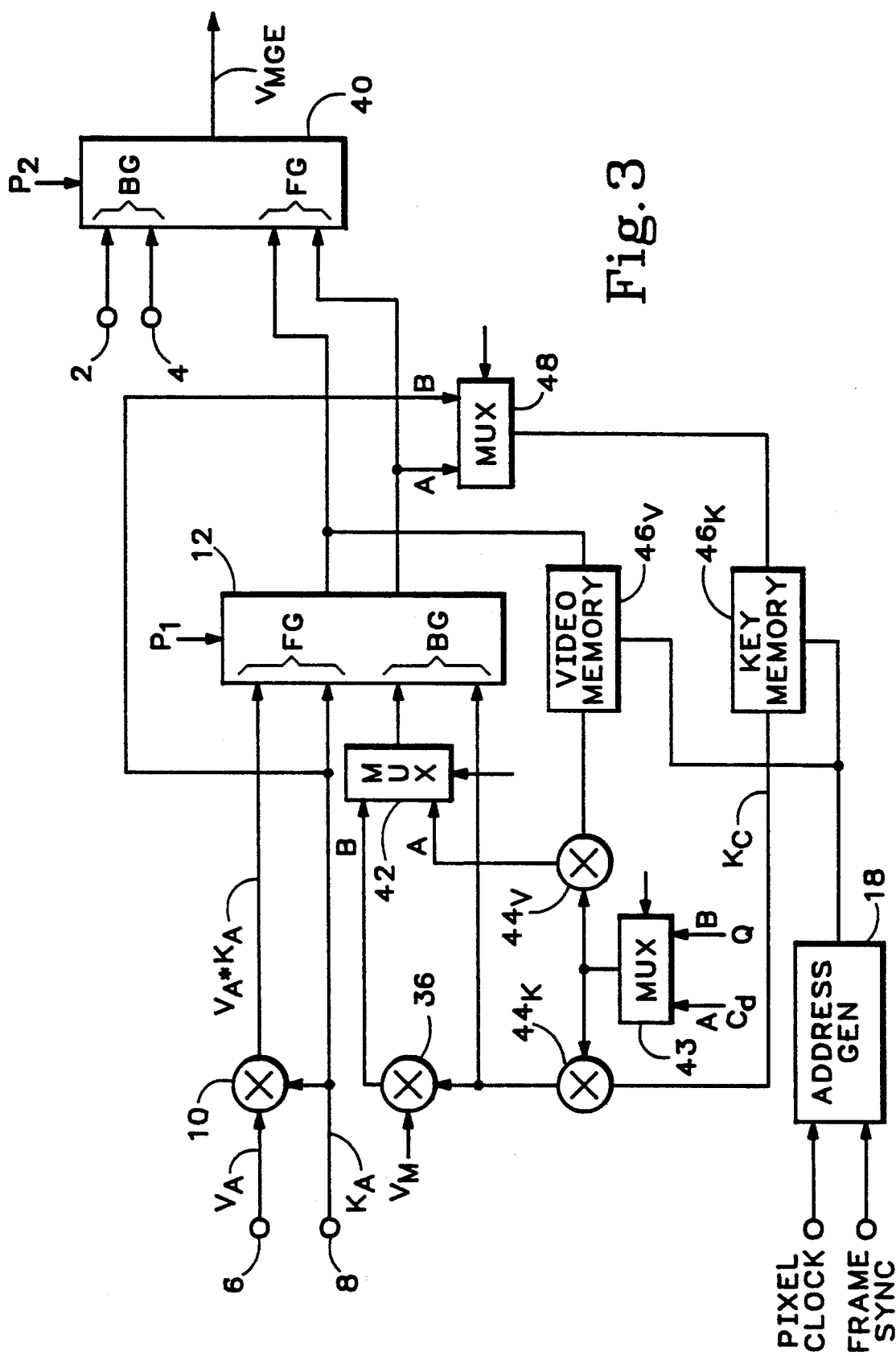
FIG. 3 illustrates modification of a recursive effects apparatus to allow the apparatus to process a shaped video signal to add a simulated shadow.

FIG. 3 illustrates apparatus similar to that shown in FIG. 2 of the co-pending application. The apparatus shown in FIG. 3 has two distinct modes of operation, namely an auto-translation mode, in which it operates in the manner described in the co-pending application, and a shadow simulation mode.

When the multiplexers 42, 43 and 48 shown in FIG. 3 select their A inputs, the shaped foreground video signal $V_A*K_A$ and the associated key control signal $K_A$ are introduced into respective recursive loops through the combiner 12, which combines the signals received from multiplier 10 and terminal 8 with signals received from loop multipliers $44_V$, $44_K$ to provide the output signals of the loops. The video and key output signals of the combiner 12 are applied to the foreground inputs of the priority combiner 40 and are also applied to respective frame memories $46_V$, $46_K$, whose outputs are applied to the loop multipliers $44_V$, $44_K$ respectively. The multipliers $44_V$, $44_K$ multiply the outputs of the memories $46_V$, $46_K$ respectively by a decay constant $C_d$. The address signals for accessing the memories are generated by the address generator 18 and the offset signal S serves as an auto-translation offset signal. In this configuration, the apparatus shown in FIG. 3 can be used to execute recursive video effects, as described in the copending application. However, when the multiplexers 42, 43 and 48 select their B inputs and the priority signal $P_1$ is set to one, the apparatus shown in FIG. 3 will function in the same way as the apparatus shown in FIG. 1.

Figure 4:
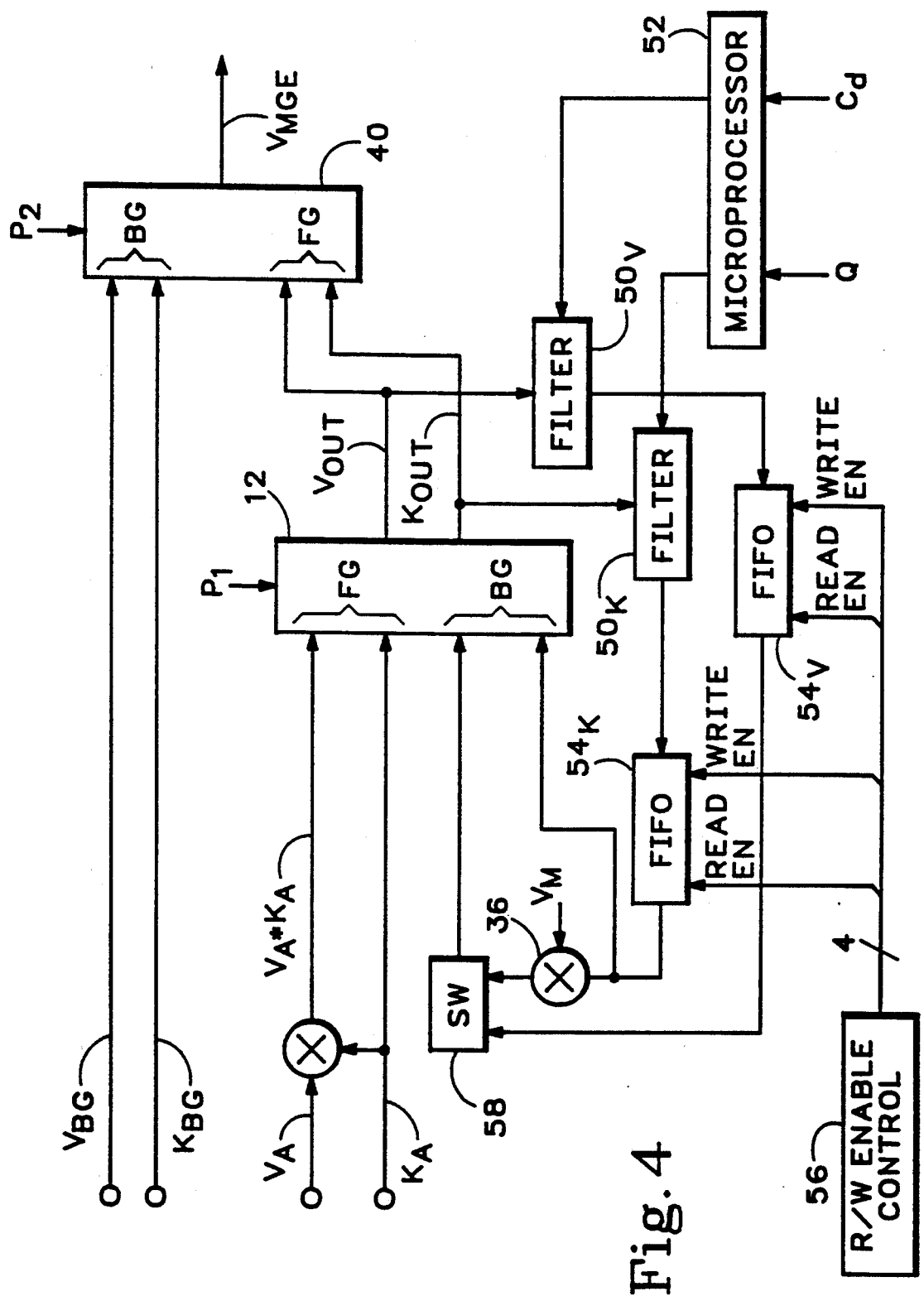
FIG. 4 illustrates modification of a second recursive effects apparatus to allow the apparatus to process a shaped video signal to add a simulated shadow.

FIG. 4 illustrates apparatus similar to that shown in FIG. 7 of the co-pending application. The FIG. 4 apparatus also has an auto-translation mode of operation and a shadow simulation mode of operation. As shown in FIG. 4, the video and key outputs of the combiner 12 are applied to respective filters $50_V$, $50_K$, which receive filter coefficients from a microprocessor 52. Preferably, for reasons that are explained in the co-pending application, the filters 50 are designed to execute a bi-linear interpolation, i.e. a linear interpolation between two adjacent lines and two adjacent pixels. The outputs of the filters 50 are applied to respective FIFO (first-in, first-out) memories $54_V$, $54_K$. The output of the FIFO memory $54_K$ is applied both to the background key input of the combiner 12 and to the multiplier 36, and the output of the memory $54_V$ is applied to a switch 58. In the auto-translation mode, the switch connects the output of the memory $54_V$ to the background video input of the combiner 12 and the coefficients supplied to the filters 50 effect a multiplication by the decay constant $C_d$ and perform other processing functions. For example, the filters might execute a low pass filtering operation to provide recursive blurring as explained in U.S. Pat. No. 4,951,144.

Writing to and reading from the FIFO memories takes place under control of a read/write control circuit 56, which receives the latency signal L and the offset signal S. Since the memories $54_V$, $54_K$ are FIFO memories, which treat their input signals as continuous linear streams rather than on a line-by-line basis, it is preferable in the case of FIG. 4 for the read/write control circuitry 56 to count only pixels for the entire frame, and it is then convenient to treat the latency offset signal L as the sum of the number of pixels per line (p) times the number of lines of vertical offset ($L_v$), plus the number of pixels of horizontal offset ($L_h$) and similarly the shadow offset signal S as the sum of the number of pixels per line (p) times the number of lines of vertical offset ($S_v$), plus the number of pixels of horizontal offset ($S_h$), and so the resultant offset signal R is given by:

$$R = p*L_v + L_h - p*S_v - S_h$$

In the shadow simulation mode, the switch 58 selects the output of the multiplier 36. The video output of the combiner 12 therefore has no effect on the background video input of the combiner 12. The filter coefficients applied to the filter $50_K$ by the microprocessor 52 are selected to effect multiplication by the opacity constant Q. Therefore, the signal that is loaded into the FIFO memory $54_K$ is a function of the key output signal $K_{OUT}$ given in Eq. [2]. The output of the memory $54_K$ is applied directly to the background key input of the combiner 12 and is applied through the multiplier 36 and the switch 58 to the background video input of the combiner. Therefore, the signal applied to the background video input of the combiner 12 represents an offset, attenuated and colored replica of the image represented by the key output of the combiner, and the combiner operates to combine this video signal with the shaped video signal $V_A*K_A$. The result is an output video signal representing a shadow that grows recursively until an equilibrium is reached when the growth of the shadow is matched with the decay due to the opacity Q. When the object represented by the input video signal moves within the raster, the shadow will follow the object in a flowing manner, so that the previous shadow will decay out and a new shadow, from the new object position, will fade up.

By using the filter $50_K$ to execute a bi-linear interpolation, the direction of the simulated shadow is not limited to discrete directions along lines from a source pixel location to a target pixel location. This flexibility allows, for example, the shadow direction to be adjusted dynamically without introducing undesirable jerkiness.

In natural images, where the light source is generally extended, the edges of shadows are normally blurred. The edges of the simulated shadow produced using the apparatus shown in FIG. 4 can be blurred by selecting the coefficients for the filter $50_K$ such that the filter also executes a two-dimensional low-pass filtering operation.

It will be appreciated that the invention is not restricted to the embodiments that have been described, and that variations may be made therein without departing from the scope of the invention as defined in the appended claims and equivalents thereof. For example, referring to FIG. 1 it is not essential to the invention that the multiplier 32 be placed downstream of the memory 16, and referring to FIG. 4 it is not essential that the filters be placed before the FIFO memories: it is necessary only that the filters be in the recursive signal path.

We claim:

1. A method of processing an input key control signal associated with a shaped video signal that represents an object to generate a signal containing simulated shadow information, said method comprising:
    (a) combining the input key control signal with a processed key control signal to provide an output key control signal, and
    (b) carrying out a selected operation on the output key control signal to provide the processed key control signal,
    and wherein said selected operation comprises translation.

2. A method according to claim 1, wherein the selected operation further comprises filtering.

3. A method according to claim 1, further comprising:
    (c) carrying out a second operation on the processed key control signal to provide a processed video signal, and (d) combining the processed video signal with the shaped video signal to provide an output video signal.

4. A method according to claim 2, wherein the second operation comprises multiplication by a color video signal.

5. A method according to claim 2, further comprising combining the output video signal and the output key control signal with a background video signal and a background key control signal in accordance with a selectable priority value to provide a montage video signal.

6. Apparatus for processing an input key control signal associated with a shaped video signal that represents an object to generate a signal containing simulated shadow information, said apparatus comprising:

means for combining the input key control signal with a processed key control signal to provide an output key control signal, and means for carrying out a selected operation on the output key control signal to provide the processed key control signal, and wherein the selected operation comprises translation.

7. Apparatus according to claim 6, wherein the selected operation further comprises filtering.

8. Apparatus according to claim 6, further comprising:

means for carrying out a second operation on the processed key control signal to provide a processed video signal, and means for combining the processed video signal with the shaped video signal to provide an output video signal.

9. A method according to claim 8, wherein the second operation comprises multiplication by a color video signal.

10. A method according to claim 8, further comprising means for combining the output video signal and the output key control signal with a background video signal and a background key control signal in accordance with a selectable priority value to provide a montage video signal.

* * * * *